(12) United States Patent
Ono et al.

(10) Patent No.: US 6,437,846 B1
(45) Date of Patent: Aug. 20, 2002

(54) LIQUID CRYSTAL DISPLAY DEVICE AND ELECTRONIC DEVICE INCLUDING SAME

(75) Inventors: Yoichi Ono; Akira Tsukahara; Shoji Hinata, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/786,145

(22) Filed: Jan. 21, 1997

Related U.S. Application Data (63) Continuation of application No. 08/335,819, filed on Jan. 20, 1995, now abandoned.

(30) Foreign Application Priority Data

Mar. 15, 1993 (JP) .................................. 5-054064

(51) Int. Cl.⁷ .................... G02F 1/1335; G02F 1/1345
(52) U.S. Cl. ...................... 349/149; 349/96; 349/113
(58) Field of Search ................... 359/88, 87; 349/149, 349/151, 152, 139, 150, 96, 113

(56) References Cited

U.S. PATENT DOCUMENTS

| 4,295,711 A | * | 10/1981 | Tanaka et al. .................. 359/88 |
| 4,640,581 A | * | 2/1987 | Nakanowatari et al. ........ 359/88 |
| 4,666,078 A | * | 5/1987 | Ohno .......................... 349/152 |
| 4,697,885 A | * | 10/1987 | Minowa et al. ................ 359/88 |
| 4,767,189 A | * | 8/1988 | Hayashi et al. ................ 359/88 |
| 4,826,297 A | * | 5/1989 | Kubo et al. .................... 359/88 |
| 4,832,455 A | * | 5/1989 | Takeno et al. ............... 349/149 |
| 5,042,919 A | * | 8/1991 | Yabu et al. .................. 349/150 |
| 5,105,289 A | * | 4/1992 | Soneharn et al. ............. 359/70 |
| 5,193,022 A | * | 3/1993 | Hirai ............................ 359/88 |
| 5,270,848 A | * | 12/1993 | Takabayashi et al. ........ 349/152 |
| 5,296,952 A | * | 3/1994 | Takatsu et al. ................ 359/70 |
| 5,510,918 A | * | 4/1996 | Matsunaga et al. ........... 359/88 |

FOREIGN PATENT DOCUMENTS

| DE | 3-711417 | 10/1988 | |
| EP | 0501413 | 9/1992 | |
| GB | 2160693 | 12/1985 | |
| JP | 58 143319 | 8/1983 | |
| JP | 58-143319 | 11/1983 | |
| JP | 61 210326 | 9/1986 | |
| JP | 61-210326 | 2/1987 | |
| JP | 62 159116 | 7/1987 | |
| JP | 62-159116 | 12/1987 | |
| JP | 4-177224 | * | 6/1992 ............ 359/88 |

* cited by examiner

*Primary Examiner*—Toan Ton
(74) *Attorney, Agent, or Firm*—Hogan & Hartson, LLP (57) ABSTRACT

A liquid crystal display device comprising a flexible substrate of, for example, plastic film. At least one edge of a pair of polarizers (9, 10), which are arranged on the liquid crystal display is extended to the region of an electrode terminal (7) which is formed on a substrate (2). By increasing the mechanical strength of the electrode terminal (7) of the liquid crystal display, terminal electrode cracks caused by mechanical stress that increase during the manufacturing process and incorporation into electronic calculators can be decreased and further, a liquid crystal display with a decreased number of disconnections and high reliability can be realized.

18 Claims, 8 Drawing Sheets

LIQUID CRYSTAL DISPLAY DEVICE AND ELECTRONIC DEVICE INCLUDING SAME

This is a continuation of application Ser. No. 08/335,819 filed on Jan. 20, 1995, now abandoned.

BACKGROUND OF THE INVENTION

1. Field of the Invention

The present invention relates to a liquid crystal display which uses a flexible substrate. More particularly the present invention relates to an electronic Device that includes said liquid crystal display.

2. Related Background Art

The structure of conventional liquid crystal displays that use flexible substrates such as plastic film will be explained by referencing to FIGS. 13A–13C.

Figure 13A:
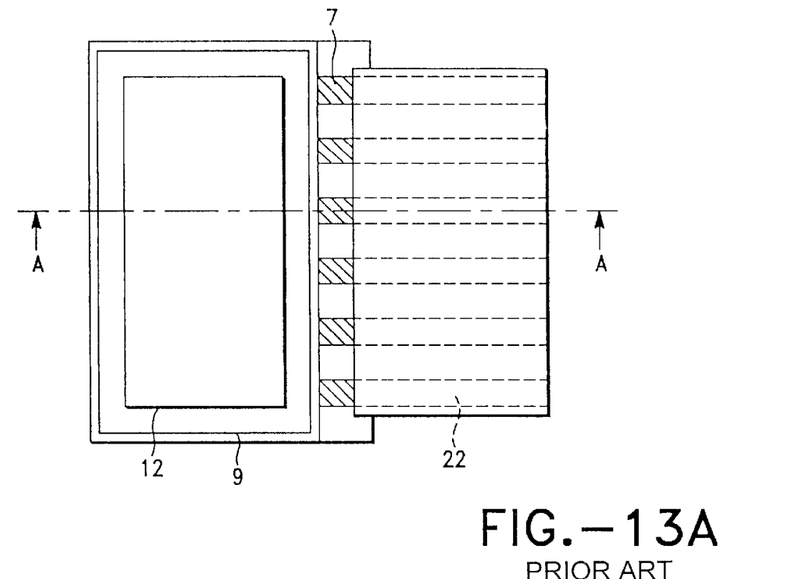
FIGS. 13A–13C are diagrams showing the structure of a conventional liquid crystal display.
Figure 13B:
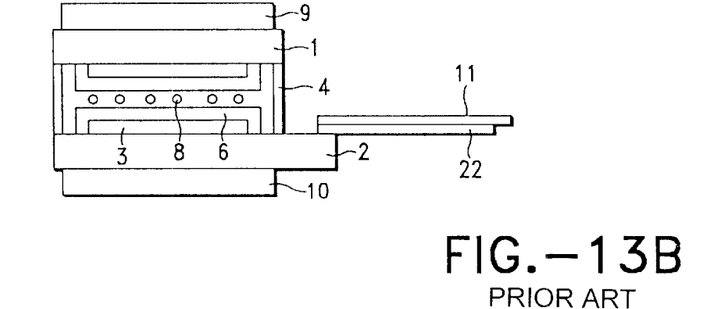
Figure 13C:
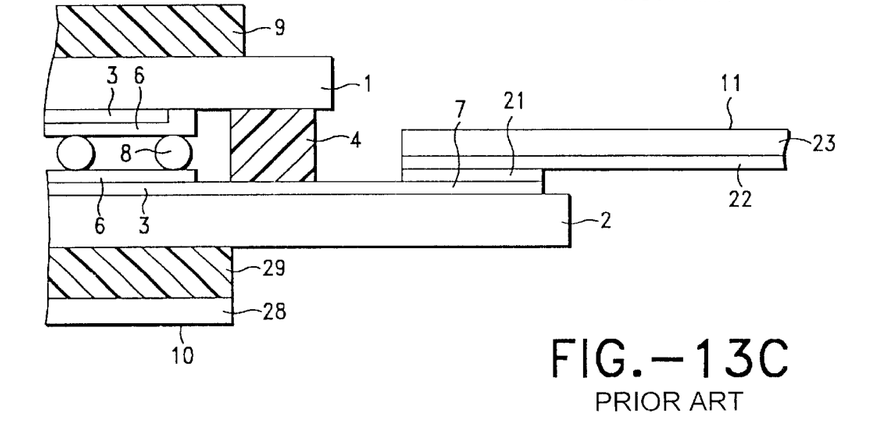

FIGS. 13A–13C are diagrams showing the use in a liquid crystal display of a heat seal connector as an electrical connector material for making an electrical connection with an external circuit.

FIG. 13A is a top plan view when looking from the front side of the display of the liquid crystal display. FIG. 13B is a cross-sectional view taken from the A—A line of FIG. 13A. FIG. 13C is a cross-sectional view of the requisite portions of FIG. 13B. In these figures, an upper polarizer 9 and a lower polarizer with reflector plate 10 are generally equal to or are greater than the possible display range 12 of the liquid crystal display. Consequently, upper polarizer 9 and lower polarizer with reflector plate 10 are nearly the-same size as the smaller sized substrate of the pair of upper substrate 1 and lower substrate 2 (upper substrate 1 in the case of FIG. 13) and arranged in nearly the same position. For example, see Japanese patent Laid-Open (Kokai) publication No. 3-96921 (1991).

However, because an electrode terminal 7 formed above lower substrate 2 of the conventional liquid crystal display is constructed with one flexible plastic film (for example, thickness of approximately 100 $\mu$m), when external forces arise during the manufacturing process or when incorporating into an electronic device, electrode terminal 7 can easily bend, cracks can appear in the transparent electrode of electrode terminal 7, and disconnections or wire breakage occur. Also, if the exposed transparent electrode of electrode terminal 7 is touched, flaws can occur in the transparent electrode resulting in disconnections. Further, in the case when there is pressure exerted on electrode terminal 7 during the incorporation into an electronic device, cracks and disconnections may occur due to the edge of upper substrate 1, which faces lower substrate 2, where electrode terminal 7 is formed, being forced against the transparent electrode of electrode terminal 7. Consequently, a liquid crystal display using a flexible substrate such as plastic film must be handled extremely delicately. In view of this, large problems are caused in the production process such as an increased number of process steps and a decrease in yield. These are problems that don't exist in liquid crystal displays that use glass substrates.

The present invention is created in view of these problems in conventional technology. It is an object of the present invention to provide for a highly reliable liquid crystal display where disconnections do not occur in the electrode terminal as well as to provide for an electronic device that incorporates the same.

SUMMARY OF THE INVENTION

The liquid crystal display in accordance with one embodiment of the present invention comprises a liquid crystal sandwiched between a pair of flexible substrates and a pair of polarizers disposed on the outside of the substrates and further comprising the edge of at least one of said polarizers constructed so as to extend up to an electrode terminal area for making connection to an external driving circuit.

The liquid crystal display may further comprise an electrode terminal, a resin mold formed so that an external circuit connecting material covers said electrically connected edge, and a reinforcement plate disposed on the outside of said extended polarizer.

The liquid crystal display wherein both edges of the pair of polarizers are extended to the electrode terminal region further comprises a resin mold formed in an opening between an electrode terminal and an edge of one of said polarizers.

The liquid crystal display in accordance with another embodiment of the present invention comprises a liquid crystal display having liquid crystal sandwiched between a pair of substrates that comprise a polarizing film enclosed by a high polymer film comprising an electrode terminal for making contact with an external driving circuit, and a reflector plate, the reflector plate arranged on the back face of one of the substrates and extended to the region of the electrode terminal.

An electronic device of the present invention further incorporates one of the liquid crystal displays described above.

Other objects and attainments together with a fuller understanding of the invention will become apparent and appreciated by referring to the following description and claims taken in conjunction with the accompanying drawings.

BRIEF DESCRIPTION OF THE DRAWINGS

Similar reference characters refer to similar parts throughout the various embodiments of the present invention.

DESCRIPTION OF THE PREFERRED EMBODIMENTS

Embodiment 1

Figure 1:
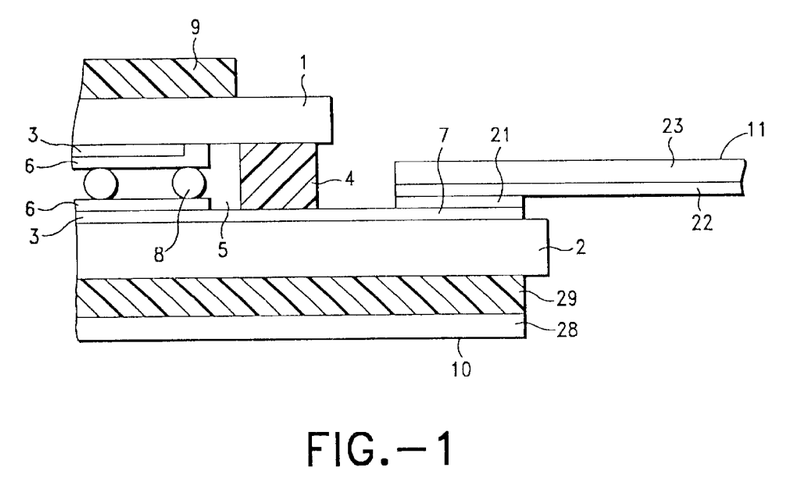
FIG.1 is across-sectional view of a liquid crystal display in accordance with a first embodiment of the present invention.

FIG. 1 is a cross-sectional view of a liquid crystal display in accordance with a first embodiment of the present invention. The liquid crystal display in FIG. 1 is comprised of an upper substrate 1, a lower substrate 2, a transparent electrode 3 which consists of an ITO layer (indium tin oxide), a seal material 4, a liquid crystal 5, an orientation layer 6, electrode terminal 7, a spacer 8, an upper polarizer 9, and a lower polarizer with reflector plate 10. As shown in that figure, reflector 28 is disposed on polarizer 29. In this embodiment, a heat seal connector is used as an external circuit connecting material 11. Conductive layer 22 is disposed on one surface of heat seal connector 11 and a flexible sheet 23 is joined to layer 22. An electrical connection with electrode terminal 7 is made via a conductive ink 21.

The manufacturing process for the liquid crystal display in accordance with this embodiment will now be explained. Polyethersurphone ("PES") film of an approximate thickness of 100 μm is used on upper substrate 1 and lower substrate 2. Transparent electrode 3 is formed on both substrate surfaces by a low-temperature sputtering process and then a prescribed pattern is formed by, for example, photolithography. Above this, orientation layer 6, which may be comprised of polyamide, is disposed through offset printing and then baked. Next, after rubbing orientation layer 6 with a cloth in a prescribed direction, seal material 4, an epoxy-type adhesive material with a prescribed gap material (for example, PF-80 made by Nippon Electric Glass co., Ltd) is screen printed on one of the substrates. Next, spacer 8 (for example, SP-2085E micropearl made by SEKISUI FINE CHEMICAL CO., LTD) is disseminated by wet process spray above the substrates and the two substrates set opposing each other. Spacer 8 is distributed with a density of approximately 50–400 units/mm, and preferably, 100–200 units/mm. Next, liquid crystal 5 is charged by vacuum implantation and sealed by an epoxy adhesive. After the liquid crystal cell is prepared in this manner, upper polarizer 9 (preferably, a thickness of 120 μm) is disposed on the outside of upper substrate 1 of the liquid crystal cell. Lower polarizer with reflector plate 10 (preferably, a thickness of 180 μm), which is extended to the region of electrode terminal 7, is disposed at the outside of lower substrate 2. Further, heat seal connector, as an external circuit connecting material 11, is connected to electrode terminal 7 by thermo-compression bonding. Although, the liquid crystal cell is a twist nematic (TN) type, where the twist angle of the liquid crystal is 90 degrees, a super twist nematic (STN) type, where the twist angle of the liquid crystal is adjusted between a range of 180 degrees to 360 degrees, is also possible.

To compare a conventional device at the same time with the present invention, a device is formed where a heat seal connector is electrically connected to a liquid crystal display that is disposed with a lower polarizer with reflector plate 10 that is the same size as upper polarizer 9. The thermo-compression bonding of the heat seal connector may be before the polarizer is disposed.

The liquid crystal display formed in accordance with the present invention will now be compared with the liquid crystal display of conventional devices through bending and pressure tests.

These tests simulated the external pressure, among others, that is generated in manufacturing processes of the liquid crystal display as well as when the liquid crystal display is incorporated into an electronic device.

Figure 11A:
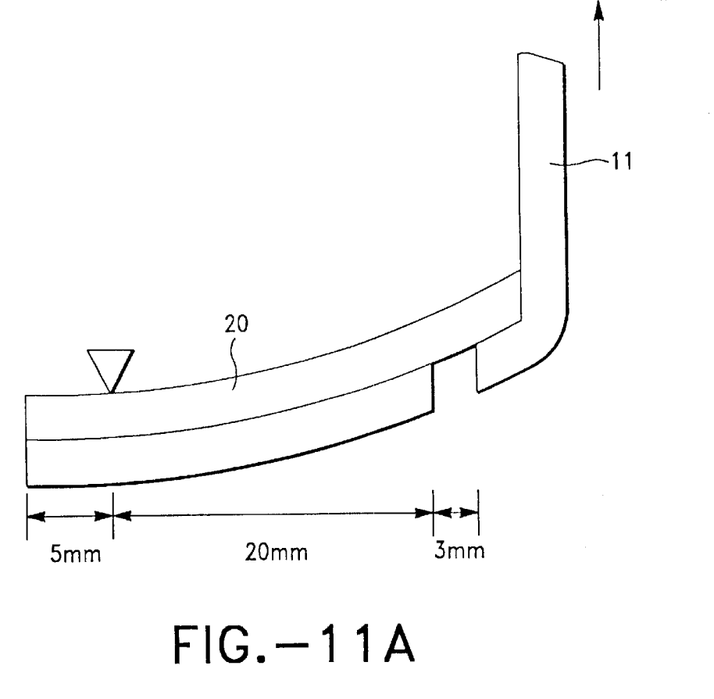
FIGS. 11A and 11B show a method for conducting a bending test of the liquid crystal display.
Figure 11B:
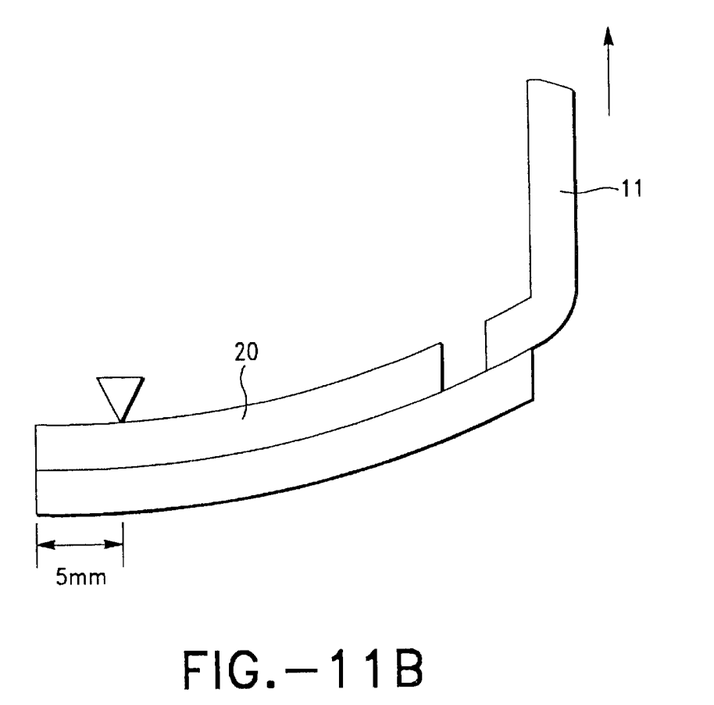

The bending test, as shown in FIGS. 11A and 11B, is a test where 5 mm on the opposite side of the electrode terminal is held down and the heat seal connector of external circuit connecting material 11 is pulled to the upper side (both figures are side perspectives during the operation of the tests). In this test, 50 g increments (500 g increments when over 1000 g) of pulling power is applied. The pulling power that causes cracks and disconnections to occur is investigated (for convenience in explanation, FIG. 11A is called Bending Test A, and FIG. 11B is called Bending Test B).

Figure 12:
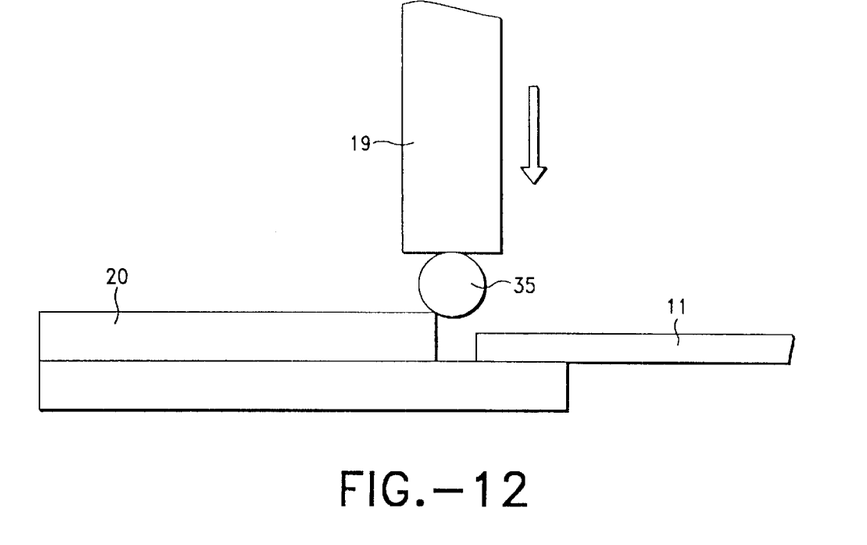
FIG. 12 shows a method for conducting a pressure test of the liquid crystal display.

As shown in FIG. 12, the pressure test includes a pressure test means with a hardball 35 of diameter of 1 cm to put pushing pressure against liquid crystal display 20. The pressure is applied for approximately 3 seconds so that the weight was exerted on the edge of the upper substrate that opposes the lower substrate where the electrode terminal is formed. The weight is increased in 500 g increments to determine where cracks appear and disconnections occur.

As a result of the tests as shown in Table 1, the ability of the transparent electrode of the electrode terminal to withstand cracking and the difference in the number of disconnections that occurred can be determined. According to these tests the liquid crystal display of the present invention is between two to three times stronger than conventional devices.

Figure 10A:
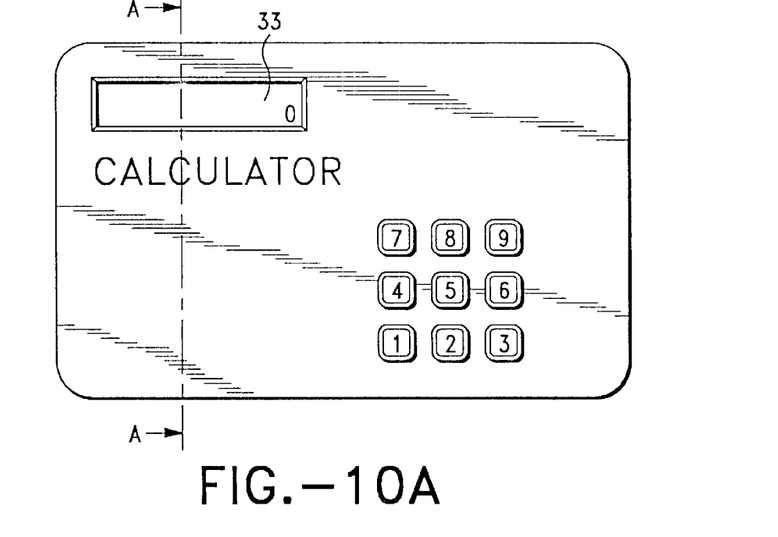
FIGS. 10A and 10B are diagrams of a liquid crystal display in accordance with the subject invention incorporated into a card-type electronic table-top calculator.
Figure 10B:
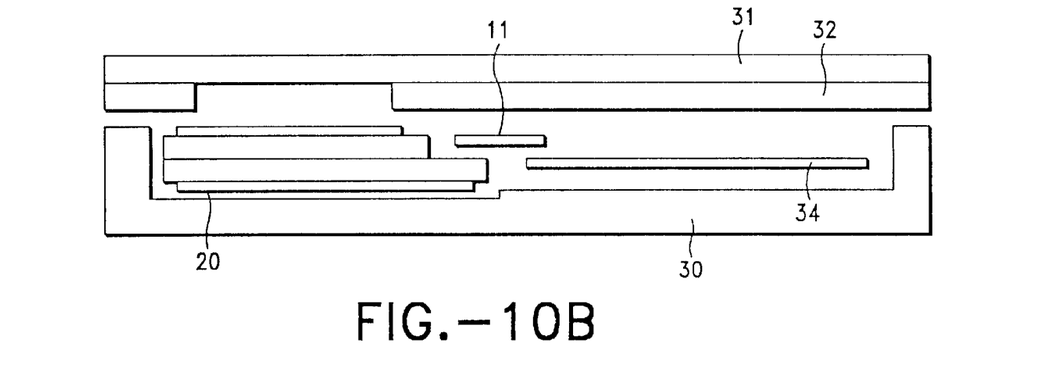

Further, when the liquid crystal display in accordance with the present embodiment is incorporated into a card-type electronic table-top calculator, as shown in FIGS. 10A and B, and a test is performed to find the percentage of disconnections occurring, there were two disconnections that occurred out of 5000 in a conventional device. However, in the present invention there were zero disconnections out of a possible 5000. Consequently, the shock resistance in a card-type electronic table-top calculator improves as well. The present invention can especially play a role in portable devices.

FIGS. 10A and 10B will now be explained. FIG. 10A is a plan view of the surface of an electronic table-top calculator. FIG. 10B is a cross-sectional view taken from the line A—A of FIG. 10A. FIG. 10 comprises a surface portion 33, a decorative panel 31, a conductive layer for inputting such things as numbers 32, a circuit board 34, a case 30, an external circuit connecting material 11, and the liquid crystal display of the present embodiment 20. FIG. 10B shows each of these parts broken down into pieces, however, in actuality each of these are compacted within case 30.

When a test of the percentages of disconnections occurring when the liquid crystal display device of the present invention was incorporated into electronic pocket books, pagers, portable telephones, and other electronic devices, the same results as those above were obtained. Thus, it can play an active role in these type of electronic devices.

TABLE 1

|  | Bending Test A | Bending Test B | Pressure Test |
| --- | --- | --- | --- |
| Embodiment 1 | Disconnection at 700 g | Disconnection at 600 g | Disconnection at 2000 g |
| Embodiment 2 | Disconnection at 900 g | Disconnection at 900 g | Disconnection at 5000 g |
| Embodiment 3 | Disconnection at 2000 g | Disconnection at 2000 g | OK at 100000 g |
| Embodiment 4 | Disconnection at 4000 g | Disconnection at 4000 g | OK at 100000 g |
| Embodiment 6 | Disconnection at 500 g | Disconnection at 600 g | Disconnection at 2000 g |
| Embodiment 7 | Disconnection at 3000 g | Disconnection at 3000 g | OK at 100000 g |
| Conventional type | Disconnection at 250 g | Disconnection at 200 g | Disconnection at 15000 g |

Embodiment 2

Figure 2:
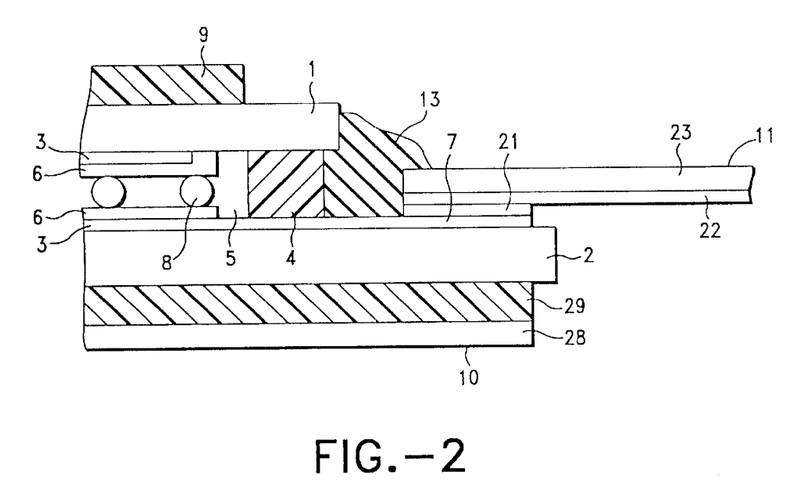
FIG. 2 is a cross-sectional view of a liquid crystal display in accordance with a second embodiment of the present invention.

As shown in FIG. 2, resin mold 13 (for example, SE9157 made by Dow Corning Toray Silicone Co. Ltd) is applied by a dispenser and then hardened by heating for one hour at 60° C. so as to cover external circuit connecting material 11 and transparent electrode 3 of electrode terminal 7 of a liquid crystal display formed in the same way as embodiment 1. As shown in Table 1, when a similar test to that of embodiment 1 is performed, even better results than embodiment 1 are obtained.

Embodiment 3

Figure 3:
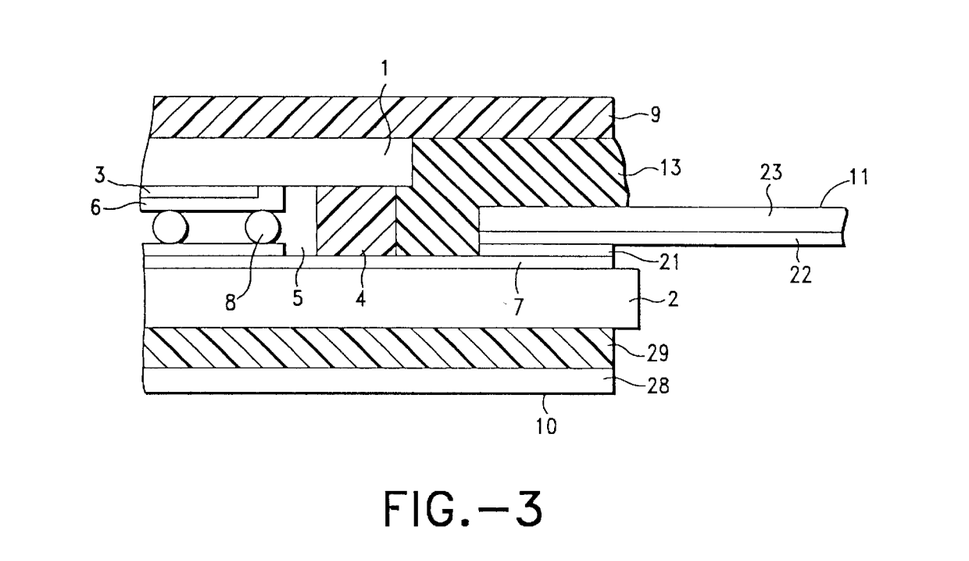
FIG. 3 is a cross-sectional view of a liquid crystal display in accordance with a third embodiment of the present invention.

As shown in FIG. 3, a liquid crystal display is constructed with upper polarizer 9 extended on upper substrate 1 so that it covers up to the region of electrode terminal 7, lower polarizer 10 extended on lower substrate 2 so as to cover up to the region of electrode terminal 7, and similar to embodiment 2, resin mold 13 applied between electrode terminal 7 and upper polarizer 9 and then hardened. The rest of the description will be omitted as the other elements of the liquid crystal display, such as the arrangement of the seal material 4 and spacer 8, are similar to embodiment 1.

As shown in Table 1, when a test similar to embodiment 1 is performed on the liquid crystal display, results are obtained that surpass both embodiment 1 and embodiment 2.

Embodiment 4

Figure 4:
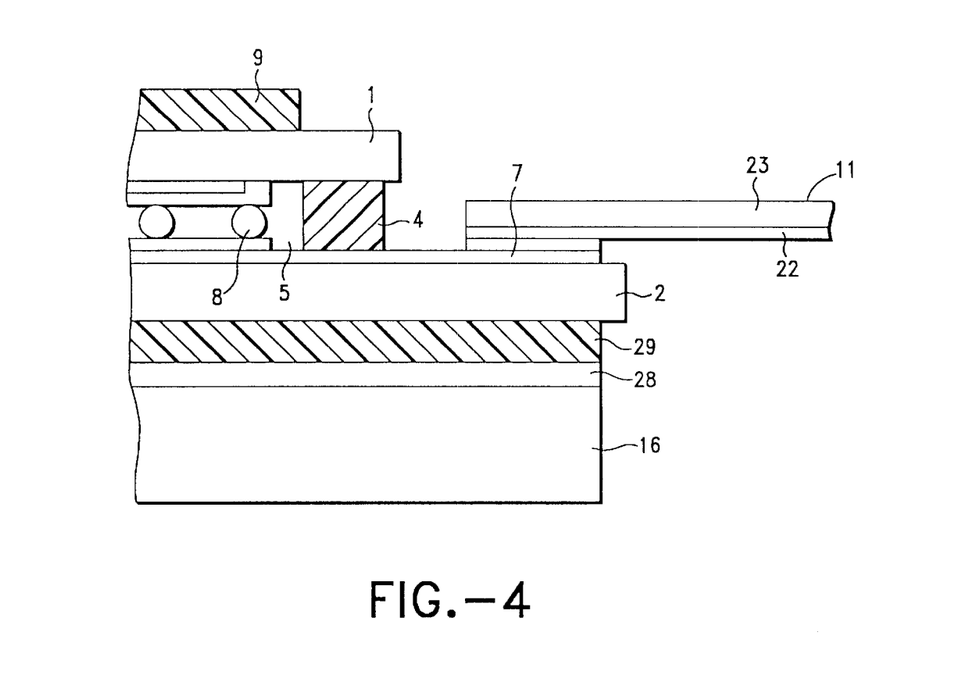
FIG. 4 is a cross-sectional view of a liquid crystal display in accordance with a fourth embodiment of the present invention.

As shown in FIG. 4, an acrylic substrate 16 (approximate thickness of 200 μm) is disposed as a strengthening plate below lower-polarizer with reflector of a liquid crystal display formed in accordance with embodiment 1. The results obtained are shown in Table 1. A detailed description will be omitted because, except for acrylic substrate 16, the present embodiment has a similar structure to that of embodiment 1.

Embodiment 5

Figure 5:
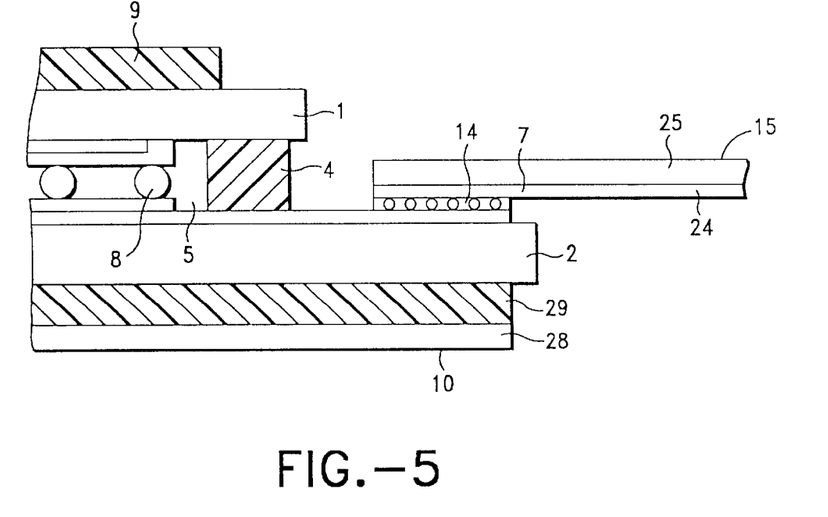
FIG. 5 is a cross-sectional view of a liquid crystal display in accordance with a fifth embodiment of the present invention.

As shown in FIG. 5, in the present embodiment, instead of the heat seal connector used as external circuit connecting material 11 in embodiment 1, a flexible circuit board (FPC) 15 is used where rolled copper 24 is patterned in the prescribed configuration above polyamide film 25. Electrode terminal 7 makes electrical connection with FPC 15 by way of an anisotropic conductive adhesive 14. Anisotropic conductive adhesive 14 is well known in the wart. Because conductive particles are mixed in the adhesive, it is conductive in the longitudinal direction and it behaves as an insulator in the lateral direction. In the present invention it is known as anisotropic conductive adhesive, but it is also known as an anisotropic conductive film or anisotropic conductive sheet.

As shown in Table 1, when a test similar to embodiment 1 is performed, the results are similar to embodiment 1.

Embodiment 6

Figure 6:
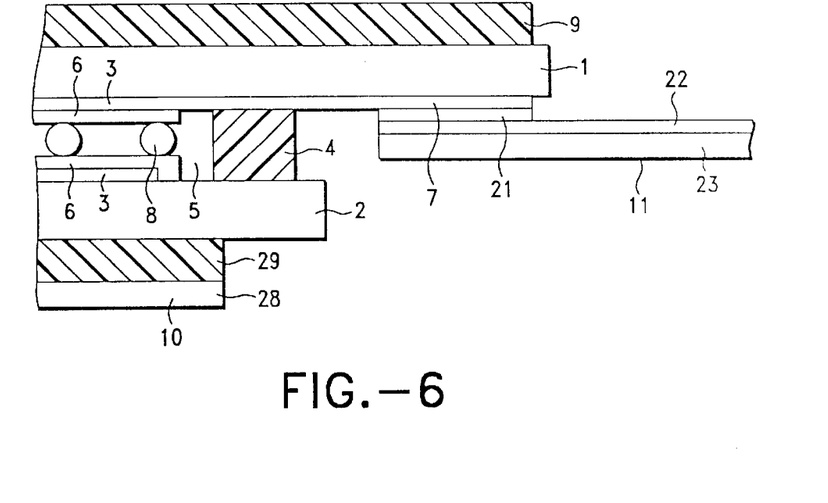
FIG. 6 is a cross-sectional view of a liquid crystal display in accordance with a sixth embodiment of the present invention.

In embodiment 1, the edge of the observer side film substrate (upper substrate 1) is not extended, while the terminal portion of the film substrate (lower substrate 2) facing it is extended and electrode terminal 7 formed. In the sixth embodiment, as shown in FIG. 6, a liquid crystal display comprises electrode terminal 7 provided at the observer side film substrate (upper substrate 1). When this liquid crystal display is tested in a similar manner as embodiment 1, the results shown in Table 1 are obtained. In the pressure test, a value lower than the conventional type was obtained. However, in bending tests A and B, a strength of approximately ten times greater than the conventional type was realized.

Embodiment 7

Figure 7:
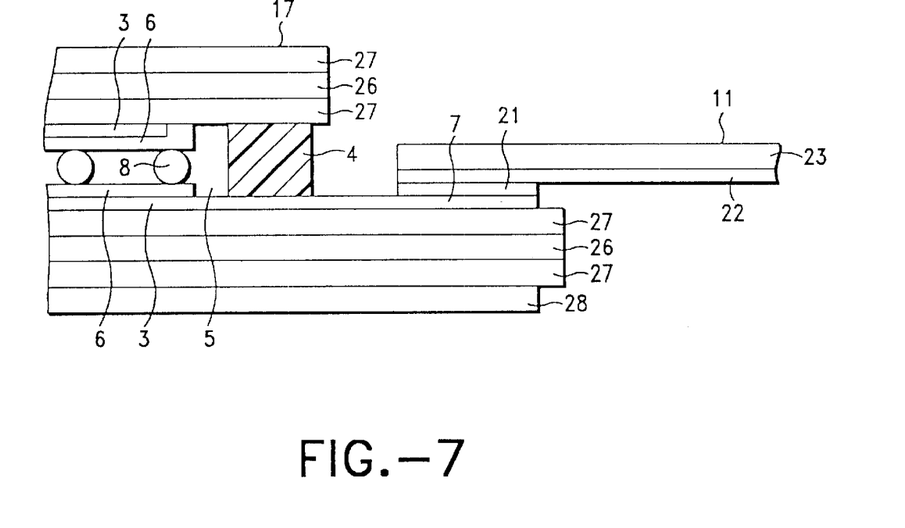
FIG. 7 is a cross-sectional view of a liquid crystal display in accordance with a seventh embodiment of the present invention.

As shown in FIG. 7, instead of upper substrate 1 and lower substrate 2 of embodiment 1, a single-body upper substrate 17 with polarizing film where a polarizing layer 26 (approximate thickness of 25 μm) is sandwiched between a pair of PES film 27 (approximate thickness of 100 μm) and a single-body lower substrate with polarizing film where polarizing film 26 (approximate thickness of 25 μm) is sandwiched between a pair of PES films 27 (approximate thickness of 100 μm) is used. The liquid crystal display is then formed with reflector 28 attached to the lower side. Here, reflector 28 is extended up to the region of the electrode terminal 7. Except for using a single-body substrate with polarizing film, the construction is similar to embodiment 1.

When a test is performed similar to embodiment 1 on this liquid crystal display, as shown in Table 1, results are obtained that are next to as good as embodiment 4.

In the present embodiment, polarizing film 26 is sandwiched between PES film 27. However, it is not limited to only PES film, as other high polymer film can also be used. Also, the liquid crystal display of the present embodiment, as stated in embodiment 1, can be applied in other electronic devices such as electronic table top calculators, electronic notebooks, pagers, and portable telephones.

Embodiment 8

Figure 8:
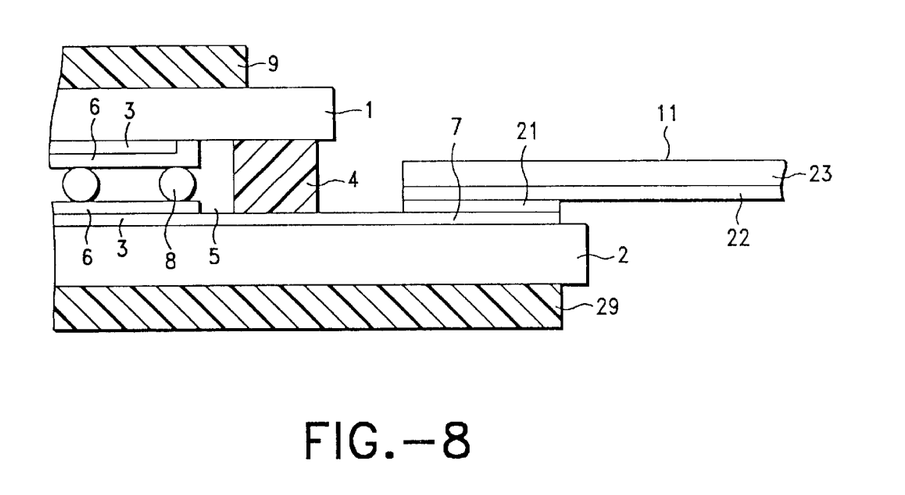
FIG. 8 is a cross-sectional view of a liquid crystal display in accordance with an eighth embodiment of the present invention.

As shown in FIG. 8, instead of lower polarizer with reflector plate 10 used in embodiment 1, a lower polarizer 29 (approximate thickness of 120 μm) with no reflector is used. Other than that, the structure is similar to that of embodiment 1. The liquid crystal display of embodiment 1 is a so called reflector-type, while the present embodiment is a transparent-type.

When a test similar to embodiment 1 is performed on this liquid crystal display, results similar to embodiment 6 are obtained.

It is desirable, as even better results can be achieved, if the extended portion of lower polarizer with reflector plate 10 used in embodiment 1 through embodiment 6 and the extended portion of lower polarizer 29 used in the present embodiment is extended to the end-face of the external circuit connecting material 11 (heat seal connector or FPC) which is connected above electrode terminal 7, or is even extended further so as to overlap more than 1 mm.

Embodiment 9

Figure 9:
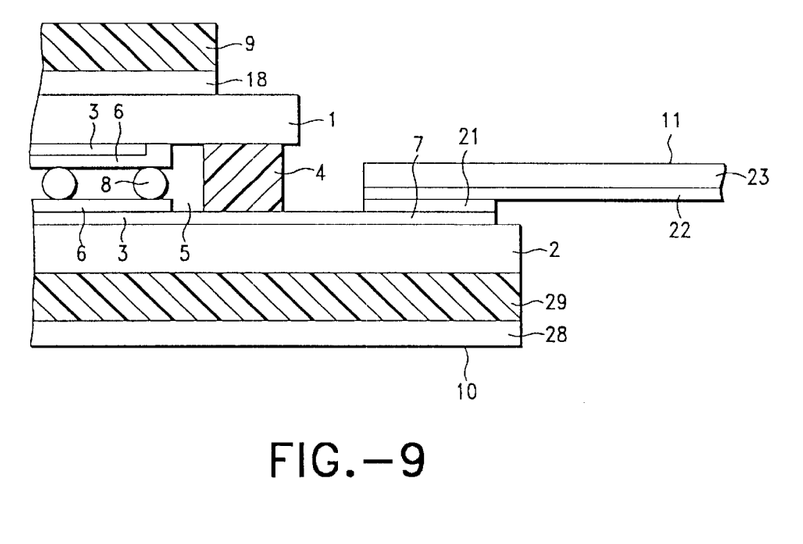
FIG. 9 is a cross-sectional view of a liquid crystal display comprising a phase difference plate arranged,between a liquid crystal display and a polarizer.

Each of the previously described embodiments use TN type liquid crystal cells. In this embodiment, as shown in FIG. 9, a phase difference plate 18 is arranged between upper substrate 1 and upper polarizer 9. Also, the liquid crystal cell is an STN type. Phase difference plate 18 is a film made of such things as polycarbonate or polyvinyl alcohol. A black and white display can be realized by optically compensating color display which are unique to STN types. Also, when a color filter is formed on this liquid crystal cell, color displays are also possible. In regards to liquid crystal displays such as these, much detail is written in Japanese patent Laid-Open No. 3-50249 (1991)

In this embodiment, with the STN type liquid crystal cell prepared with the above-described phase difference plate, it further comprises a pair of flexible substrate with such things as film, and similar to the previous described embodiments above, a polarizer with reflector plate 10 disposed on the lower side of lower substrate 2. In this situation, it has the same type of effects as embodiment 1.

Although the present embodiment is a reflector-type that uses a polarizer with reflector, the present invention is still effective even if a transparent-type that uses a polarizer without a reflector is used.

In accordance with the present invention, and as discussed above, by extending at least one of the upper and lower polarizers to the electrode terminal in a liquid crystal display that employs a flexible substrate such as plastic film, the mechanical strength of the electrode terminal can be increased, terminal electrode cracks caused by mechanical stress that increase during the manufacturing process of the liquid crystal display or incorporation into electronic devices can be decreased and further, a liquid crystal display with a decreased number of disconnections and high reliability can be realized.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A liquid crystal display having liquid crystal sandwiched between a pair of flexible substrates, said liquid crystal display further having a pair of polarizers each disposed on an outer side of a respective one of said substrates, said liquid crystal display comprising:

an electrode terminal area disposed on an edge of at least one of said substrates, wherein each of said pair of polarizers has an edge extending beyond the liquid crystal and up to said electrode terminal area, and said electrode terminal area is electrically connected by thermo-compression bonding to an external driving circuit, after said at least one of said polarizers has been disposed on an outer side of a respective one of said substrates, via an external circuit connecting material.

2. A liquid crystal display having liquid crystal sandwiched between a pair of flexible substrates, said liquid crystal display further having a pair of substrates and a pair of polarizers, one of said polarizers and one of said substrates disposed on each side of said liquid crystal, said liquid crystal display comprising:

an electrode terminal area disposed on an edge of at least one of said substrates, wherein each of said pair of polarizers has an edge extending beyond the liquid crystal and up to said electrode terminal area.

3. The liquid crystal display of claim 2, and further comprising:

an electrical connector in electrical contact with the electrode terminal area, wherein at least a part of the electrical connector is disposed between said pair of polarizers.

4. The liquid crystal display of claim 3, and further comprising:

an intermediate structural material disposed between the electrical connector and at least one of said pair of polarizers.

5. The liquid crystal display of claim 4, wherein said intermediate structural material is a resin mold.

6. The liquid crystal display of claim 4, wherein said intermediate structural material is in direct contact with both the electrical connector and said at least one of said pair of polarizers.

7. A liquid crystal display, comprising:

a pair of flexible substrates;

a pair of polarizers; and an electrode terminal area disposed between the pair of polarizers, wherein the electrode terminal area is disposed on at least one of the substrates;

wherein the pair of polarizers each have an edge extending up to an edge of the electrode terminal area such that the pair of polarizers are adapted to reduce bending of the electrode terminal area when stress is applied to liquid crystal display.

8. A liquid crystal display of claim 7, further comprising:

liquid crystal sandwiched between the pair of flexible substrates.

9. A liquid crystal display of claim 8, wherein the pair of polarizers each have an edge extending beyond the liquid crystal, and wherein the pair of polarizers each at least extend substantially to an end of the electrode terminal area.

10. A liquid crystal display of claim 7, wherein the electrode terminal area is disposed on a first surface of at least one of the substrates.

11. A liquid crystal display of claim 10, wherein the pair of polarizers are each disposed on a second surface of a respective one of the substrates, wherein the second surface is opposite the first surface.

12. A liquid crystal display of claim 11, wherein the electrode terminal area is electrically connected, via an external circuit connecting material, to an external driving circuit, such that the pair of polarizers are adapted to reduce bending of the electrode terminal area when stress is applied to liquid crystal display.

13. A liquid crystal display of claim 12, wherein the electrode terminal area is electrically connected, via an external circuit connecting material, to an external driving circuit by thermo-compression bonding after at least one of the polarizers has been disposed on the second of the respective one of the substrates, such that the pair of polarizers are adapted to reduce bending of the electrode terminal area when stress is applied to liquid crystal display.

14. The liquid crystal display of claim 7, and further comprising:

an electrical connector in electrical contact with the electrode terminal area, wherein at least a part of the electrical connector is disposed between said pair of polarizers.

15. The liquid crystal display of claim 14, and further comprising:

an intermediate structural material disposed between the electrical connector and at least one of said pair of polarizers.

16. The liquid crystal display of claim 15, wherein said intermediate structural material is a resin mold.

17. The liquid crystal display of claim 15, wherein said intermediate structural material is in direct contact with both the electrical connector and said at least one of said pair of polarizers.

18. The liquid crystal display of claim 7, wherein one of said pair of polarizers is substantially superposed over the other of said pair of polarizers.

* * * * *